(12) United States Patent
Hommeltoft et al.

(10) Patent No.: US 7,595,035 B2
(45) Date of Patent: Sep. 29, 2009

(54) PROCESS FOR THE RECOVERY OF SULFURIC ACID

(75) Inventors: Sven Ivar Hommeltoft, Pleasant Hill, CA (US); Morten Thellefsen, Hillerod (DK)

(73) Assignee: Haldor Topsoe A/S, Lyngby (DK)

( * ) Notice: Subject to any disclaimer, the term of this patent is extended or adjusted under 35 U.S.C. 154(b) by 66 days.

(21) Appl. No.: 11/806,827

(22) Filed: Jun. 4, 2007

(65) Prior Publication Data

US 2007/0286794 A1  Dec. 13, 2007

(51) Int. Cl.
  *C01B 17/69* (2006.01)
  *C01B 17/74* (2006.01)

(52) U.S. Cl. .................. 423/522; 423/529; 423/531; 423/532; 423/533

(58) Field of Classification Search .............. 423/522, 423/529, 531, 532, 533; 422/129, 160, 161, 422/168
  See application file for complete search history.

(56) References Cited

U.S. PATENT DOCUMENTS

| | | | | |
|---|---|---|---|---|
| 3,364,202 | A | * | 1/1968 | Elmendorp et al. ......... 423/523 |
| 4,371,512 | A | * | 2/1983 | Sardisco et al. ............. 423/551 |
| 4,575,403 | A | | 3/1986 | Rosenhouse et al. |
| 5,118,490 | A | | 6/1992 | McAlister |

FOREIGN PATENT DOCUMENTS

| | | |
|---|---|---|
| DE | 40 19 184 | 3/1991 |
| DE | 43 00 131 | 7/1994 |

* cited by examiner

*Primary Examiner*—Timothy C Vanoy
(74) *Attorney, Agent, or Firm*—Dickstein Shapiro LLP

(57) ABSTRACT

Process for the recovery of sulfuric acid comprising:
(a) contacting a stream containing sulfuric acid vapor and/or sulfur trioxide in an absorption stage with a ionic liquid absorbent,
(b) withdrawing a gas substantially free of sulfuric acid vapor and/or sulfur trioxide from said absorption stage,
(c) withdrawing a stream comprising the ionic liquid absorbent from said absorption stage, in which said ionic liquid absorbent contains sulfuric acid,
(d) recovering sulfuric acid from said ionic liquid absorbent by passing the stream of step (c) through a separation stage,
(e) withdrawing from the separation stage (d) a stream rich in sulfuric acid,
(f) withdrawing from the separating step (d) a ionic liquid absorbent stream in which said ionic liquid absorbent contains sulfuric acid and returning said stream to the absorption step (a).

8 Claims, 2 Drawing Sheets

PROCESS FOR THE RECOVERY OF SULFURIC ACID

FIELD OF THE INVENTION

The present invention relates to a process for the recovery of sulfuric acid from plants in which sulfuric acid is produced from sulfur dioxide feed gases such as exhaust gases from metallurgical operations and from the combustion of hydrogen containing fuels like spent acid from petrochemical alkylation, hydrogen sulfide, ammonium sulfate waste and fossil fuels including heavy oil residues and petroleum coke. In particular, the invention relates to a novel process for the recovery of sulfuric acid involving an absorption step in which a mixture of sulfuric acid and bisulfate salt is used as absorbent. The invention relates also to an apparatus for the recovery of sulfuric acid from the absorbent.

BACKGROUND OF THE INVENTION

The production of sulfuric acid from exhaust gases in industrial operations is normally conducted by a catalytic oxidation stage, where $SO_2$ is converted to $SO_3$ followed by a hydration step, whereby $SO_3$ is converted to sulfuric acid vapor. The sulfuric acid is then condensed in a cooling step by indirect heat exchange with a cooling medium, normally air, in a so-called single wet condensation stage. The sulfuric acid is condensed directly, and therefore it is required that the temperature of the $SO_3$ containing stream entering said cooling step is close to its dew point so as to avoid undesired acid mist formation. If the temperature is too high, the acid will not condense, and if the temperature is too low, an acid mist is formed which is difficult to trap. Another disadvantage of a process with a single wet condensation stage is that depending on the condenser design and process conditions some acid mist is still emitted from the condenser.

U.S. Pat. No. 5,455,015 describes a process for the conversion of $SO_2$ to $SO_3$, where subsequently $SO_3$ in the wet gas or $H_2SO_4$ ($H_2O+SO_3$) is absorbed in a melt. The absorption of $H_2SO_4$ is conducted by bobbling the gas containing $SO_3$ through the melt having a mixture of ammonium sulfate $(NH_4)_2SO_4$ and ammonium bisulfate $NH_4HSO_4$ and which involves the reaction $H_2SO_4+(NH_4)_2SO_4 \rightarrow 2\ NH_4HSO_4$. Ammonium bisulfate is then converted to ammonium sulfate by heating to above 350° C. or by electrolysis after which the sulfate is returned to the melt. Other sulfates disclosed are $Na_2SO_4$ and $K_2SO_4$. This patent is silent about acid mist formation and relies in the reaction of sulfuric acid with a sulfate to produce a bisulfate. The conversion of the bisulfate back to sulfate is not simple and requires expensive treatments such as thermal treatment at high temperature for instance. above 350° C. when using ammonium sulfate or electrolysis. In addition, the presence of sulfate in the acid-sulfate mixture is inexpedient, as the sulfate increases the melting temperature of the melt. Ammonium sulfate has a melting point of above 300° C. and already in a mixture of ammonium sulfate and ammonium bisulfate having only 20 wt % ammonium sulfate the melting point is above 200° C. (L. Cambi, G. Bozza, Ann. Chim. Appl. 13 (1923), 221).

SUMMARY OF THE INVENTION

It is an object of the present invention to provide a process for the recovery of sulfuric acid from gases containing $SO_3$ that enables better control of acid mist formation compared to conventional processes in which $SO_3$ is converted to sulfuric acid vapor and the sulfuric acid is condensed in a cooling step by indirect heat exchange with a cooling medium.

It is another object of the present invention to provide a process for the recovery of sulfuric acid from gases containing $SO_3$ involving the absorption of sulfuric acid which is simple, and where the recovery of sulfuric acid from the absorbent does not require the use of expensive process steps such as electrolysis or thermal treatment at high temperatures.

These and other objects are solved by the present invention. Accordingly, we provide a process for the recovery of sulfuric acid comprising:

(a) contacting a stream containing sulfuric acid vapor and/or sulfur trioxide in an absorption stage with a ionic liquid absorbent, wherein the ionic liquid absorbent comprises a mixture of bisulfate and sulfuric acid, said bisulfate comprising at least one of the salts from the group $R_3NH\ HSO_4$, $LiHSO_4$, $NaHSO_4$, $KHSO_4$, $RbHSO_4$, $CsHSO_4$, where R=H—, alkyl, aryl and wherein the content of sulfuric acid in the mixture is 5 to 90 wt %, (b) withdrawing a gas substantially free of sulfuric acid vapor and/or sulfur trioxide from said absorption stage, (c) withdrawing a stream comprising the ionic liquid absorbent from said absorption stage, in which said ionic liquid absorbent contains sulfuric acid, (d) recovering sulfuric acid from said ionic liquid absorbent by passing the stream of step (c) through a separation stage, (e) withdrawing from the separation stage (d) a stream rich in sulfuric acid, (f) withdrawing from the separating step (d) a ionic liquid absorbent stream in which said ionic liquid absorbent contains sulfuric acid and returning said stream to the absorption step (a).

In this patent specification the terms sulfuric acid ($H_2SO_4$) and acid are used interchangeably.

The term wet gas containing $SO_3$ and/or H2SO4 as used herein means a gas containing $SO_3$ and/or $H_2SO_4$ in which the molar ratio $H_2O/SO_3$ is at least 1.05. It will also be understood that sulfuric acid may also be represented by the reaction $H_2SO_4 = SO_3 + H_2O$.

The stream containing sulfuric acid vapor and/or sulfur trioxide entering the absorption stage is a gas having a temperature in the range 300° C. to 600° C. depending on the point of extraction of the stream from a $SO_2$ converter. Preferably, this stream containing sulfuric acid vapor and/or sulfur trioxide has a temperature of 350° C., which corresponds to said stream being extracted from the fourth and last catalyst bed of a conventional $SO_2$ converter. A stream extracted from the first catalyst bed of a conventional $SO_2$ converter has a temperature close to 600° C.

The presence of sulfuric acid as part of a mixture in the ionic liquid absorbent withdrawn in the absorption stage enables a simple separation of the acid from the rest of the absorbent, thereby providing a process for acid recovery which eliminates the need of expensive high temperature sulfuric acid regeneration process or electrolysis and which are otherwise required when treating pure bisulfate streams. The acid may be absorbed at a temperature where water is not condensed, and as a result it is easier to produce acid with low water content in the subsequent recovery of the acid from the ionic liquid absorbent.

The ionic liquid absorbent comprises a mixture of bisulfate and sulfuric acid, said bisulfate comprising at least one of the salts from the group $R_3NH\ HSO_4$, $LiHSO_4$, $NaHSO_4$, $KHSO_4$, $RbHSO_4$, $CsHSO_4$, where R=H—, alkyl, aryl and wherein the content of sulfuric acid in the mixture is 5 wt % to 90 wt %, preferably 15 wt % to 60 wt %. Thus, in step (a)

the ionic liquid absorbent entering the absorption stage may contain sulfuric acid in amounts of 10 wt % to 50 wt %, preferably 20 wt % to 40 wt %, often about 30 wt %, for instance 35 wt %. In step (c) after the absorption stage, the content of sulfuric acid in the absorbent is greater than that of step (a) and is preferably in the range 15 wt % to 80 wt %, more preferably 30 wt % to 50 wt %, often about 40 wt %. Preferably, the absorbent is $NaHSO_4$ or $KHSO_4$ most preferably ammonium bisulfate (R=H). The ionic liquid absorbent may further comprise pyrosulfate in amounts not exceeding 5 wt %, which may be formed by dehydration of the bisulfate.

The presence of the bisulfate salt in the ionic liquid absorbent serves to lower the vapor pressure of the sulfuric acid over the condensed phase thus opening the temperature window defined by the difference between the temperature where the acid is condensed and the gas phase temperature at which acid mist formation occurs. In other words, it becomes possible to condense the acid at a temperature above its dew point. Consequently, it becomes easier to avoid acid mist formation or at least reduce it compared to conventional wet absorption methods. In addition, since the acid is absorbed in a liquid medium that has a significant heat capacity, it is possible to remove heat with the ionic liquid and consequently there is no need for a conventional large heat exchanger operating on the total gas flow under conditions where hot acid is condensed on the heat transfer surface in order to produce sulfuric acid.

By treating the wet gas containing $SO_3$ and/or $H_2SO_4$ with an absorbent where bisulfate and acid are present as a mixture, it is also possible to operate the absorbent in liquid form at a temperature as low as 50° C. This facilitates the operation of the process, since the absorbent may be transported around by pumping. No expensive heating is required in order to keep the absorbent in its liquid form throughout the process. For instance, for ammonium bisulfate with no sulfuric acid present the melting point is above 140° C., but as the sulfuric acid content increases the melting point of the mixture decreases substantially. For example, a 50:50 mole mixture of ammonium bisulfate and sulfuric acid has a melting point of about 50° C. The contact process with said wet gas may be conducted by passing it through a melt bath containing said ionic liquid absorbent. Preferably, the stream containing the ionic liquid absorbent in step (a) is introduced in a column packed with inert bodies or simply in a sprayed tower. The inert bodies are similar in nature to the types of materials used in packed distillation towers and liquid extraction towers such as acid resistant ceramic Raschig rings or saddles.

The wet gas stream containing $SO_3$ and/or $H_2SO_4$ entering the absorption stage is normally about 350° C. During the absorption stage an increase in temperature will occur while some minor temperature reduction in the stream containing the absorbent takes place in the subsequent separation stage (d). Hence in another embodiment of the invention the returned stream of step (f) is preferably cooled to about 150° C. or below prior to entering the absorption step (a). Preferably, the temperature of the absorbent in absorption step (a) is in the range 100° C. to 350° C., more preferably 150° C. to 300° C. Operation within these temperature ranges ensures that the absorbent is present in its liquid form regardless of the amount of sulfuric acid in the absorbent and facilitates the introduction of the absorbent in the absorption stage by spraying.

The sulfuric acid in the mixture of sulfuric acid and bisulfate salt withdrawn from the absorption stage (a) requires regeneration by passing the stream containing the mixture of sulfuric acid and bisulfate salt through the separation stage (d). As such the bisulfate salt in the mixture is an additive which requires separation. The recovery of sulfuric acid is conventionally conducted by concentrating the acid by distillation. The sulfuric acid may for instance be kept at its boiling temperature by applying reduced pressure and by indirect heating with steam. This demands significant heat requirements in order to maintain the acid at its boiling temperature as well as special materials in the distillation unit to withstand the highly corrosive environment encountered when boiling the acid. By the invention, the separation stage (d) is conducted by distillation under reduced pressure (vacuum). The bisulfate salt of the ionic liquid absorbent lowers the vapor pressure of the sulfuric acid to a level corresponding to the simple condensation of the pure acid 30° C.-200° C. lower than that at atmospheric pressure. Thus, contrary to conventional processes, there is no need for external heat supply in the distillation, as the heat capacity of the mixture containing the bisulfate salt is used to distil out the acid.

In a preferred embodiment, the distillation is conducted by passing the stream containing the ionic liquid absorbent through one or more vacuum chambers containing a bed of inert contact material and which are externally cooled. The inert contact material may be arranged as a fixed bed within the vacuum chamber. This enables that the liquid absorbent is spread over a large surface area from which the sulfuric acid can evaporate, while the external cooling serves to cool surfaces in the vacuum chamber, where the evaporated acid can condense and be separated. The inert contact material is similar in nature to the types of materials used in packed distillation towers and liquid extraction towers such as acid resistant ceramic Raschig rings or saddles. The sulfuric acid vapor is then condensed on a cooling surface of the vacuum chamber and the condensed sulfuric acid is withdrawn as a substantially bisulfate salt-free stream of sulfuric acid, where the acid concentration is 97% or preferably 99 wt % or above, corresponding to a concentration above the azeotrope (98.5 wt %). After evaporation of the acid from the bed of inert contact material a residual acid-bisulfate salt mixture is withdrawn from the bottom of the bed and returned to the absorption stage.

In another embodiment of the invention, prior to step (a) a feed gas containing $SO_2$ passes through at least one catalytic bed in which $SO_2$ is converted to $SO_3$ to form said stream of sulfuric acid vapor and/or sulfur trioxide. Preferably, said stream of sulfuric acid vapor and/or sulfur trioxide is a stream withdrawn from the last bed of a catalytic $SO_2$ converter, in which $SO_2$ is converted to $SO_3$ by the passage of the feed containing $SO_2$ through a number of catalytic beds with interbed cooling to remove the heat from the exothermic and equilibrium limited reaction: $SO_2+\frac{1}{2}O_2=SO_3$. In yet another embodiment of the invention, said stream of sulfuric acid vapor and/or sulfur trioxide is a stream withdrawn from any bed of a catalytic $SO_2$ converter, preferably from the penultimate catalytic bed of the $SO_2$ converter. The withdrawal of sulfuric acid and/or sulfur trioxide between the beds in a multibed (at least one bed) catalytic $SO_2$ converter improves the overall conversion of the above equilibrium limited conversion of $SO_2$ by removing product from the equilibrium prior to passing the sulfuric acid and/or sulfur trioxide depleted stream to the subsequent catalytic bed.

Thus in a further embodiment of the invention encompasses a process wherein prior to step (a) a feed gas containing $SO_2$ passes through at least one catalytic bed in which $SO_2$ is converted to $SO_3$ to form said stream of sulfuric acid vapor and/or sulfur trioxide, and the stream rich in sulfuric acid of step (e) is passed to a subsequent catalytic bed in which $SO_2$ is converted to $SO_3$.

Accordingly, the inventive process may serve as intermediate absorption process in between catalytic beds of an $SO_2$ converter, preferably in between the penultimate and last catalytic beds, normally between the third and fourth catalytic beds of an $SO_3$ converter. A number of advantages are associated with this embodiment. Intermediate absorbers work normally by cooling the hot process gas from a bed of an $SO_2$ converter down to the inlet temperature of the intermediate absorber, which is often about 300° C. The acid mist (or water-free $SO_3$) is absorbed and the process gas is cooled to about 120° C. or below in order to achieve the lowest possible acid vapour pressure out of the absorber, as it is important to avoid acid mist in the outlet process gas. The thus cleaned (acid mist free) process gas from the intermediate absorber has to be reheated to about 380° C. prior to entering the final catalytic bed, e.g. the fourth bed of the catalytic $SO_2$ converter. By using the inventive process as intermediate absorption stage it is possible to absorb about 95-98% of the acid vapour at significantly higher absorbent temperatures, such as 200° C. or higher, whereby the process gas will be free of acid mist. At the same time it is possible to maintain a higher temperature in the process gas and thereby reduce heating requirements prior to entering the subsequent, e.g. the final catalytic bed of the $SO_2$ converter compared to conventional intermediate absorption stages in which the temperature only is about 100° C. and as a result a high duty is required to heat the process gas from the intermediate absorber to about 380° C. prior to entering the final catalytic bed of the $SO_2$ converter.

The invention provides also an apparatus for the recovery of sulfuric acid from a stream containing a mixture of sulfuric acid and additives in which said apparatus is a vacuum chamber, wherein said mixture containing the acid passes via an inlet in the vacuum chamber through a bed of inert contact material arranged within the chamber and from which at least part of the sulfuric acid in the mixture evaporates, wherein the evaporated acid leaves the bed towards a cooled surface of the chamber and is condensed as a concentrated sulfuric acid stream and is withdrawn from the chamber through a first outlet, and wherein a mixture of sulfuric acid and the additives in substantially liquid form is collected from the bed and withdrawn from the chamber through a second outlet.

The apparatus of the invention is applicable to additives in the mixture containing sulfuric acid which are able to reduce the vapor pressure of the sulfuric acid. The mixture of sulfuric acid and additives is preferably a ionic liquid absorbent which comprises a mixture of bisulfate and sulfuric acid said bisulfate comprising at least one of the salts from the group $R_3NH$ $HSO_4$, $LiHSO_4$, $NaHSO_4$, $KHSO_4$, $RbHSO_4$, $CsHSO_4$, where R=H—, alkyl, aryl, in which the content of sulfuric acid in the mixture is 5 wt % to 90 wt %, more preferably 15 wt % to 80 wt %, for instance 30 wt % to 50 wt %, often about 40 wt %.

By conducting the evaporation of the acid from the ionic liquid absorbent in the apparatus of the invention, there is direct contact between the vessel wall and the hot bisulfate only after evaporation of the acid. This evaporation of the acid, which is mainly adiabatic, results in a drop in temperature that enables the use of highly desirable materials in the vacuum chamber and downstream equipment such as for instance Teflon for pipe lining, graphite and enamel. These materials are not attacked by the corrosive bisulfate but cannot be used at temperatures above 250-300° C. By the invention, the residual ionic liquid mixture withdrawn from the bottom of the bed is cooled to lower temperatures than if no adiabatic evaporation of the acid had taken place, thereby enabling the use of Teflon, graphite and enamel in particularly downstream equipment. This is particularly expedient during the operation of the process since potentially costly shutdowns of the plant needed for replacement of parts or equipment are prevented.

The vacuum chamber is preferably in the form of a flash distillation chamber operated at a pressure of 0.01 mbar to 100 mbar, preferably 0.1 mbar to 10 mbar. The chamber is externally cooled by water so as to provide for the cooled surface of the chamber, i.e. cooled chamber wall. The external cooling is preferably provided as a cooled jacket surrounding the chamber. Alternatively, a cooling coil or a combination of a cooled jacket and cooling coil may provide for the external cooling. The evaporated acid in the bed of inert contact material travels radially or upwardly in the chamber and comes into contact with the cooled wall in the chamber. As the acid condenses it falls as a film along the cooled wall and is withdrawn through a first outlet at the bottom of the chamber as a stream of above 99 wt % sulfuric acid. Below the bed of inert contact material, a collection zone may be arranged in order to capture the bisulfate salt together with the acid that has not evaporated. An outlet is arranged in the collection zone to permit the withdrawal of the acid-bisulfate salt mixture. The bed of inert contact material is preferably arranged as a fixed bed in a compartment within the reactor in the form of a basket and which is spaced apart from the reactor walls. This ensures that direct contact of hot and corrosive acid-bisulfate mixture and vessel walls is prevented. The inlet for the introduction of the acid-bisulfate salt mixture is preferably arranged in top of the bed.

DETAILED DESCRIPTION

Figure 1:
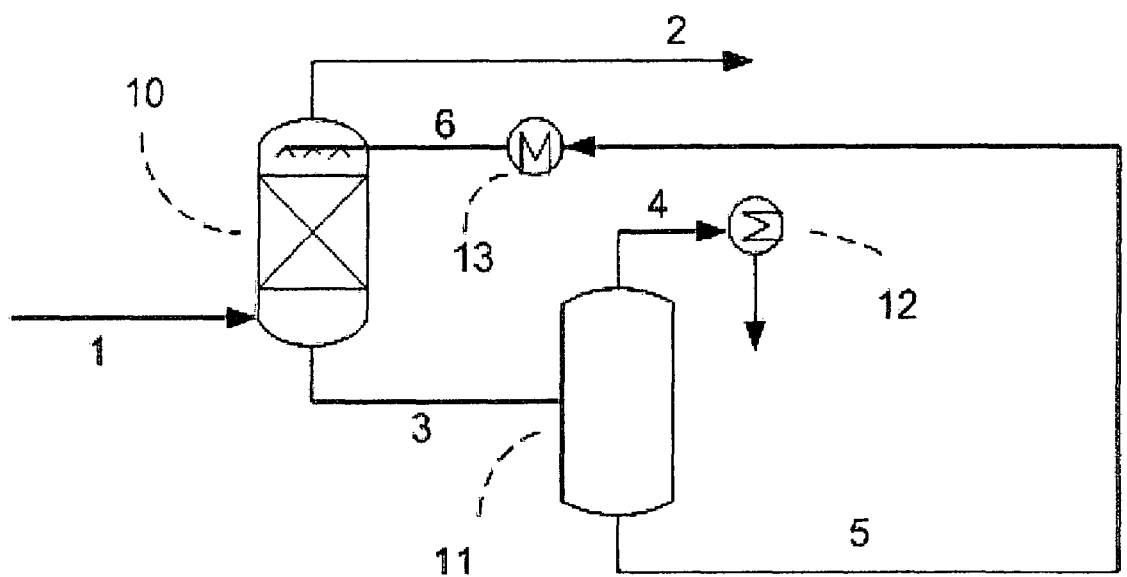
FIG. 1 shows a flow diagram of the process according to the invention.

The process is illustrated in FIG. 1. A feed stream 1 is introduced at the bottom of a packed counter flow tower in which the acid is absorbed by the ionic liquid at close to atmospheric pressure. The stream of ionic liquid with the absorbed sulfuric acid 3 is sent to an adiabatic flash vessel 11 in which the acid is subsequently flashed out of the ionic liquid mixture and condensed as stream 4 under reduced pressure (vacuum) 12. The hot stream of ionic liquid 5 from the flash is subsequently cooled into stream 6 in cooler 13 before being returned to the absorption tower 10. The transfer line carrying stream 3 operates under the pressure of the absorption. The process has two product streams: the cleaned gas 2 which contains less than 5 and preferably less than 1 ppmv sulfuric acid and the sulfuric acid stream 4 with 97% preferably above 99 wt % acid concentration.

Figure 2:
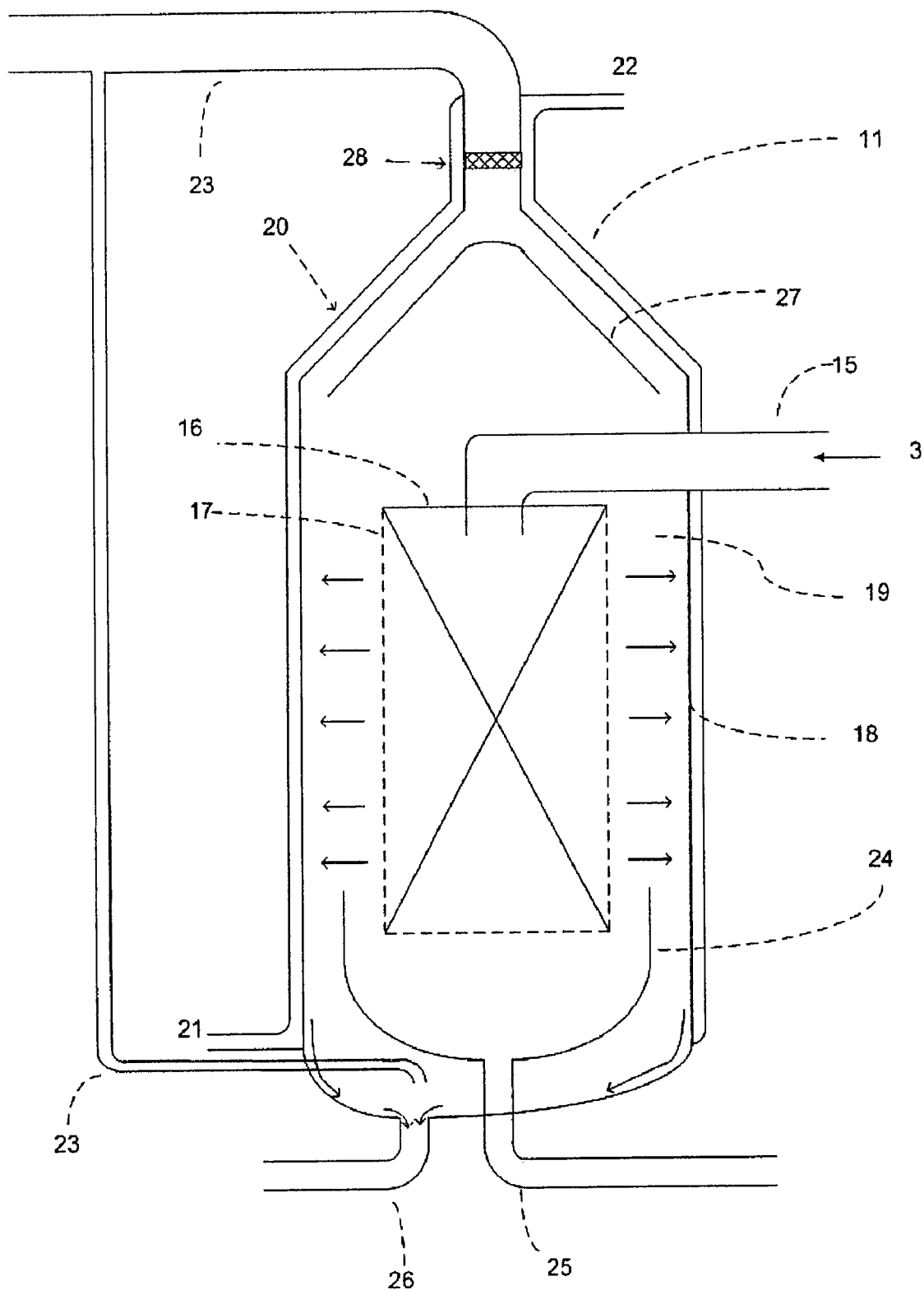
FIG. 2 shows a schematic of the apparatus for recovery of sulfuric acid from the absorbent after the absorption stage.

Referring now to FIG. 2 a vacuum chamber 11 for the recovery of sulfuric acid from the absorbent is shown, in which a stream 3 containing the absorbent is introduced via inlet 15 into a bed of inert contact material 16 confined within a basket 17 and spaced apart from the cooled surface (wall) 18 of the vacuum chamber so as to leave a free annular space 19 through which evaporated acid from the bed travels, as depicted by the arrows to the wall of the vacuum chamber. The wall is cooled by jacket 20 having corresponding inlet 21 and outlet 22 for the passage of the cooling medium for instance water. The chamber is subject to reduced pressure through vacuum arrangement 23. Below the bed of inert contact material 16 a collection zone 24 having outlet 25 is provided for the collection and withdrawal of a liquid mixture containing the bisulfate salt together with the acid that has not evaporated, and which is returned to the absorption stage. The sulfuric acid condensed in the wall of the chamber falls as a film and is collected at the bottom of the chamber where it is withdrawn through outlet 26. The vacuum chamber may also be provided with an inverse-V shaped shield 27 at the upper part of the chamber (above the bed of inert contact material) and acid demister 28 adapted to the vacuum arrangement 23 in order to prevent any slip of acid mist during operation of the apparatus.

EXAMPLE

The stream numbers correspond to those of FIG. 1.

Two cases are considered both of which assumes 100,000 $Nm^3/h$ feed stream to the absorption stage at 350° C. In case 1 the gas contains 6 vol. % $SO_3$ and 10 vol. % water and in case 2, 15 vol. % $SO_3$ and 20 vol. % water. Table 1 summarizes the temperatures and compositions of the streams in the two cases.

TABLE 1

Case 1
100.000 $Nm^3/h$ containing the equivalent of 6 mole % $SO_3$ and 10 mole % $H_2O$ (6 mole % $H_2SO_4$ and 4 mole % $H_2O$) is received at 350° C. and the cleaned gas is delivered at 150° C. Pressure in stream 4: 0.1-0.5 mbar

| Stream | 2 | 3 | 4 | 5 | 6 |
|---|---|---|---|---|---|
| Temperature (° C.) | 150 | 250 | <250 | 210 | 150 |
| Mass flow (ton/hr) | — | 326 | 26 | 300 | 300 |
| $H_2SO_4$ (wt %) | — | 40 | >99 | 34 | 34 |
| $H_2SO_4$ (ppmv) | 1 | — | — | — | — |
| Water content (wt %) | — | <0.1 | <1 | — | — |
| Water content (vol. %) | 4 | — | — | — | — |
| $NH_4HSO_4$ (wt %) | — | 60 | <0.1 | 66 | 66 |

Case 2
100.000 $Nm^3/h$ containing the equivalent of 15 mole % $SO_3$ and 20 mole % $H_2O$ (15 mole % $H_2SO_4$ and 5 mole % $H_2O$) is received at 350° C. and the cleaned gas is delivered at 150° C. Pressure in stream 4: 0.1-0.5 mbar

| Stream | 2 | 3 | 4 | 5 | 6 |
|---|---|---|---|---|---|
| Temperature (° C.) | 150 | 250 | <250 | 210 | 150 |
| Mass flow (ton/hr) | — | 665 | 65 | 600 | 600 |
| $H_2SO_4$ (wt %) | — | 40 | >99 | 34 | 34 |
| $H_2SO_4$ (ppmv) | 1 | — | — | — | — |
| Water content (wt %) | — | <0.1 | <1 | — | — |
| Water content (vol. %) | 5 | — | — | — | — |
| $NH_4HSO_4$ (wt %) | — | 60 | <0.1 | 66 | 66 |

The invention claimed is:

1. Process for the recovery of sulfuric acid comprising:
   (a) contacting a stream containing sulfuric acid vapor and/or sulfur trioxide in an absorption stage with a ionic liquid absorbent, wherein the ionic liquid absorbent comprises a mixture of bisulfate and sulfuric acid, said bisulfate comprising at least one of the salts from the group $R_3NH\ HSO_4$, $LiHSO_4$, $NaHSO_4$, $KHSO_4$, $RbHSO_4$, $CsHSO_4$, where R=H—, alkyl, aryl and wherein the content of sulfuric acid in the mixture is 5 to 90 wt %,
   (b) withdrawing a gas substantially free of sulfuric acid vapor and/or sulfur trioxide from said absorption stage,
   (c) withdrawing a stream comprising the ionic liquid absorbent from said absorption stage, in which said ionic liquid absorbent contains sulfuric acid,
   (d) recovering sulfuric acid from said ionic liquid absorbent by passing the stream of step (c) through a separation stage,
   (e) withdrawing from the separation stage (d) a stream rich in sulfuric acid,
   (f) withdrawing from the separating step (d) a ionic liquid absorbent stream in which said ionic liquid absorbent contains sulfuric acid and returning said stream to the absorption step (a).

2. Process according to claim 1, wherein the ionic liquid absorbent further comprises pyrosulfate in amounts not exceeding 5 wt %.

3. Process according to claim 1, wherein R=H.

4. Process according to claim 1, wherein the temperature of the absorbent in the absorption step (a) is in the range 100° C. to 350° C.

5. Process according to claim 1, wherein the stream containing the ionic liquid absorbent in step (a) is introduced in a column packed with inert bodies or in a sprayed tower.

6. Process according to claim 1, wherein the separation stage (d) is conducted by distillation under reduced pressure.

7. Process according to claim 6, wherein the distillation is conducted by passing the stream containing the ionic liquid absorbent through one or more vacuum chambers containing a bed of inert contact material and which are externally cooled.

8. Process according to claim 1 wherein prior to step (a) a feed gas containing $SO_2$ passes through at least one catalytic bed in which $SO_2$ is converted to $SO_3$ to form said stream of sulfuric acid vapor and/or sulfur trioxide, and the stream rich in sulfuric acid of step (e) is passed to a subsequent catalytic bed in which $SO_2$ is converted to $SO_3$.

* * * * *